(12) United States Patent
Villaume

(10) Patent No.: US 7,853,369 B2
(45) Date of Patent: Dec. 14, 2010

(54) ACTIVE PITCH CONTROL METHOD AND DEVICE FOR AN AIRCRAFT

(75) Inventor: Fabrice Villaume, Toulouse (FR)

(73) Assignee: Airbus France, Toulouse (FR)

( * ) Notice: Subject to any disclaimer, the term of this patent is extended or adjusted under 35 U.S.C. 154(b) by 576 days.

(21) Appl. No.: 11/937,935

(22) Filed: Nov. 9, 2007

(65) Prior Publication Data

US 2010/0042270 A1 Feb. 18, 2010

(30) Foreign Application Priority Data

Dec. 5, 2006 (FR) .................................. 06 10594

(51) Int. Cl.
*G05D 1/08* (2006.01)
(52) U.S. Cl. .................. 701/4; 701/15; 244/186; 706/23
(58) Field of Classification Search ................ 701/4, 701/15; 706/23; 244/186
See application file for complete search history.

(56) References Cited

U.S. PATENT DOCUMENTS

| 4,006,871 | A | * | 2/1977 | Simpson | 244/186 |
|---|---|---|---|---|---|
| 4,171,115 | A | * | 10/1979 | Osder | 244/181 |
| 4,624,424 | A | * | 11/1986 | Pinson | 244/3.21 |
| 4,699,333 | A | * | 10/1987 | Pinson | 244/3.21 |
| 4,830,311 | A | * | 5/1989 | Pritchard et al. | 244/3.15 |
| 5,088,658 | A | * | 2/1992 | Forsmo | 244/3.21 |
| 5,259,569 | A | * | 11/1993 | Waymeyer et al. | 244/3.22 |
| 5,349,532 | A | * | 9/1994 | Tilley et al. | 701/226 |
| 5,393,012 | A | * | 2/1995 | Dunn | 244/3.23 |
| 5,606,505 | A | * | 2/1997 | Smith et al. | 701/99 |
| 5,901,272 | A | * | 5/1999 | Schaefer et al. | 706/17 |
| 6,382,556 | B1 | * | 5/2002 | Pham | 244/6 |
| 6,390,417 | B1 | * | 5/2002 | Yoshino | 244/203 |
| 6,695,251 | B2 | * | 2/2004 | Rodden et al. | 244/3.21 |
| 7,296,006 | B2 | * | 11/2007 | Flynn et al. | 706/37 |
| 2007/0246605 | A1 | | 10/2007 | Lavergne et al. | |
| 2010/0042270 | A1 | * | 2/2010 | Villaume | 701/4 |

FOREIGN PATENT DOCUMENTS

| EP | 000453327 A1 | * | 10/1991 |
|---|---|---|---|
| EP | 000743584 A1 | * | 11/1996 |
| FR | 2874204 | | 2/2006 |
| FR | 2909462 A1 | * | 6/2008 |
| JP | 01119500 A | * | 5/1989 |
| JP | 06072389 A | * | 3/1994 |

(Continued)

OTHER PUBLICATIONS

Nonlinear control of aircraft at high angles of attack; Pedro, J.O.; Mansfield, B.A.; AFRICON, 2004. 7th AFRICON Conference in Africa; vol. 1; Digital Object Identifier: 10.1109/AFRICON.2004.1406711; Publication Year: 2004 , pp. 431-436 vol. 1.*

(Continued)

*Primary Examiner*—Cuong H Nguyen
(74) *Attorney, Agent, or Firm*—Dickinson Wright PLLC

(57) ABSTRACT

A device has a pitch acceleration instruction calculator that calculates a pitch acceleration instruction depending on a pitch objective and a deflection instruction calculator that calculates, from the pitch acceleration instruction, a deflection instruction for elevators of an aircraft.

16 Claims, 2 Drawing Sheets

FOREIGN PATENT DOCUMENTS

| | | | |
|---|---|---|---|
| JP | 10016892 A | * | 1/1998 |
| JP | 2005349871 A | * | 12/2005 |

OTHER PUBLICATIONS

Single baseline GPS based attitude heading reference system (AHRS) for aircraft applications; Hayward, R. et al.; American Control Conference, 1999. Proceedings of the 1999; vol. 5; Digital Object Identifier: 10.1109/ACC.1999.782448 Publication Year: 1999 , pp. 3655-3659 vol. 5.*

Pitch Control of an Aircraft with Aggregated Reinforcement Learning Algorithms; Ju Jiang; Kamel, M.S.; Neural Networks, 2007. IJCNN 2007. International Joint Conference on; Digital Object Identifier: 10.1109/IJCNN.2007.4370928 ; Publication Year: 2007 , pp. 41-46.*

Simulation research of H ∞ filter for the pitch control of AUV; Xinqian Bian et al.;Control and Decision Conference (CCDC), 2010 Chinese; Digital Object Identifier: 10.1109/CCDC.2010.5498556; Publication Year: 2010 , pp. 1788-1792.*

Pitch control of the space shuttle training aircraft; Berenji, H.R.; Saraf, S.; Ping-Wei Chang; Swanson, S.R.; Control Systems Technology, IEEE Transactions on; vol. 9 , Issue: 3; Digital Object Identifier: 10.1109/87.918906; Publication Year: 2001 , pp. 542-551.*

Experimental study on servo adaptive pitch control of a model helicopter; Benjanarasuth, T.; SICE Annual Conference, 2008 Digital Object Identifier: 10.1109/SICE.2008.4654652; Publication Year: 2008 , pp. 209-213.*

Open loop pitch control of a flapping wing micro-air vehicle using a tail and control mass; Orlowski, Christopher et al; American Control Conference (ACC), 2010; Publication Year: 2010 , pp. 536-541.*

Pitch control for running quadrupeds using leg positioning in flight; Cherouvim, N.; Papadopoulos, E.; Control & Automation, 2007. MED '07. Mediterranean Conference on; Digital Object Identifier: 10.1109/MED.2007.4433761; Publication Year: 2007 , pp. 1-6.*

LQG/LTR pitch attitude control of an earth-orbiting spacecraft ; Landhiri, T.; Alouani, A.T.; Decision and Control, 1993., Proceedings of the 32nd IEEE Conference on; Digital Object Identifier: 10.1109/CDC.1993.325108; Publication Year: 1993 , pp. 445-446 vol. 1.*

Hybrid intelligent control of a lab model helicopter pitch dynamics; Mohammadzaheri, M.; Ley Chen; Intelligent and Advanced Systems, 2007. ICIAS 2007. International Conference on; Digital Object Identifier: 10.1109/ICIAS.2007.4658367 Publication Year: 2007 , pp. 162-166.*

Future STOVL flight control: development of two-inceptor trimmap based pitch plane control law for the VAAC research aircraft Rawnsley, B.W.; Andrews, S.J.; D'Mello, G.W.; Control, 1994. Control '94. International Conference on; vol. 2 Digital Object Identifier: 10.1049/cp:19940362; Publication Year: 1994 , pp. 1517-1521 vol. 2.*

A multi-gain sliding mode based controller for the pitch angle control of a civil aircraft ; Poles, M.; Fekih, A.; System Theory (SSST), 2010 42nd Southeastern Symposium on; Digital Object Identifier: 10.1109/SSST.2010.5442854; Publication Year: 2010 , pp. 96-101.*

Preliminary Search Report -Aug. 20, 2007.

* cited by examiner

ACTIVE PITCH CONTROL METHOD AND DEVICE FOR AN AIRCRAFT

FIELD OF THE INVENTION

The present invention relates to a method and a device for carrying out active control of the pitch of an aircraft.

BACKGROUND OF THE RELATED ART

It is known that the pitch dynamics of an aircraft is sensitive to external interference (wind, ground effect, etc) and to its own characteristics (mass, trim, aerodynamic configuration, load reduction on undercarriages, rocking of bogies, etc). The pilot's workload is thus increased in order to obtain precise piloting, which can ultimately result in marginal uses of the aircraft (risk of tail touch-down on takeoff and, whilst landing, risk of hard landing). The operational availability of the aircraft can be affected by it (maintenance action necessary if the fuselage or the undercarriages are impacted).

SUMMARY OF THE INVENTION

The present invention relates to a method for the active control of the pitch of an aircraft, which makes it possible to overcome the aforesaid disadvantages.

For this purpose, according to the invention, said method is noteworthy in that:
a) a pitch objective is generated which is expressed in the form of a pitch rate and which must be applied to the aircraft;
b) from said pitch objective, there is calculated a pitch acceleration instruction Q1;
c) a deflection command δq is calculated using the following expressions:

$$\begin{cases} \delta q = (Q1 - F + \Delta RMI)/G \\ F = \rho \cdot V^2 \cdot S \cdot l \cdot Cm/2 \cdot I \\ G = \rho \cdot V^2 \cdot S \cdot l(\partial Cm/\partial \delta q)/2 \cdot I \\ \Delta RMI = K \cdot \left( -Qeff + \int (F + G \cdot \delta qeff - \Delta RMI) \cdot dt \right) \end{cases}$$

wherein:
Q1 represents said pitch acceleration instruction;
ρ is the volumic mass of air;
V is the speed of the aircraft;
S is a reference surface of the aircraft;
l is a reference length of the aircraft;
Cm represents a pitch coefficient;
I represents a pitch inertia;
$\partial Cm/\partial \delta q$ represents an efficiency coefficient;
K is a predetermined coefficient;
Qeff represents an effective pitch rate of the aircraft;
$\int$ illustrates an integration function; and
δqeff is an effective deflection angle of the elevators of the aircraft; and
d) said deflection instruction δq is applied to the elevators of the aircraft.

Control of an aircraft by pitch objective, used by the method according to the invention, allows the pilot to control in a sure and repetitive manner the pitch dynamics of the aircraft during landing and takeoff phases. With regard to the pilot, the aircraft is made insensitive to variations in mass, trim and the chosen takeoff aerodynamic configuration, to the chosen takeoff thrust and to an engine failure, whilst offering active and firm protection from tail touch-down or from a touch-down that is too hard on landing, as described below.

When applied to a cruising phase, said method furthermore makes it possible to manage, automatically and imperceptibly for the pilot, all of the transients affecting the pitch of the aircraft (deployment/retraction of undercarriages, retraction/deployment of air brakes, retraction/deployment of slats and flaps, thrust variation, etc.)

The active pitch control method according to the invention can be applied during different situations of the aircraft and, in particular:
during a movement of the aircraft for the purpose of a takeoff;
during a rotation during a takeoff;
during a flare out during a landing;
during a movement following a landing.

Moreover, this method can be applied equally well to a manual piloting mode as to an automatic piloting mode (using an automatic control means) of the aircraft.

Advantageously, in step a), said pitch objective is generated by an automatic control means of the aircraft and/or by a joystick system (comprising a pitch control joystick which is able to be operated by a pilot of the aircraft).

Moreover, advantageously:
the effective value Qeff of the pitch rate is measured; and
in step b), said pitch acceleration instruction Q1 is calculated using the following expression:

$Q1=2.z.w.(QO-Qeff)$ wherein:
QO represents said pitch objective;
z represents an adjustable damping parameter; and
w represents an adjustable fluctuation.

Moreover, in a preferred embodiment, said pitch coefficient Cm and/or said efficiency coefficient $\partial Cm/\partial \delta q$ is determined using a neural network. It is known that a neural network, described below, is an artificial intelligence system whose structure and functioning attempt to imitate the human brain, more particularly its neural network.

This preferred embodiment in particular makes it possible to generate particularly accurate coefficients Cm and $\partial Cm/\partial \delta q$.

Moreover, advantageously, the said pitch objective QO is limited to a minimum limit value QOmin and to a maximum limit value QOmax of pitch rate, before using it for calculating the pitch acceleration instruction Q1. In this case, preferably, said minimum limit value QOmin and said maximum limit value QOmax of the pitch rate respectively satisfy the following equations:

$$\begin{cases} QO\text{min} = nz\text{min}/(V \cdot g) \\ QO\text{max} = nz\text{max}/(V \cdot g) \end{cases}$$

wherein:
nzmin and nzmax are predetermined minimum and maximum values of the load factor;
g is the acceleration of gravity; and
V is the speed of the aircraft.

Moreover, advantageously, said pitch acceleration instruction Q1 is limited to a minimum limit value in order to achieve protection against a descent speed of the aircraft that is too fast during a landing. In this case, said minimum limit value Q1min is preferably calculated using the following expressions:

$$\begin{cases} Q1\min = \omega \cdot (\omega \cdot (\theta\min - \theta \mathit{eff}) - 2 \cdot Q\mathit{eff}) \\ \theta\min = \alpha\mathit{eff} + \arcsin(V\mathit{zmin}/V\mathit{sol}) \end{cases}$$

wherein:
ω represents an adjustable fluctuation,
θeff represents an effective attitude of the aircraft;
Qeff represents an effective pitch rate of the aircraft;
aeff represents an effective incidence of the aircraft;
Vzmin is a predetermined value; and
Vsol is the ground speed of the aircraft.

Moreover, said pitch acceleration instruction Q1 is advantageously also limited to a maximum limit value in order to achieve at least a protection against a tail touch-down of the aircraft during a takeoff. In this case, said maximum limit value preferably corresponds to the smallest value of three accelerations respectively corresponding to:
- a protection against a tail touch-down;
- the rotation capability of the aircraft depending on a minimum deflection of the elevators; and
- a predetermined acceleration depending on a piloting sensitivity.

The present invention also relates to an active pitch control device for an aircraft.

According to the invention, said device is noteworthy in that it comprises:
means for generating a pitch objective which is expressed in the form of a pitch rate and which must be applied to the aircraft;
means for calculating, from said pitch objective, a pitch acceleration instruction;
means for determining the effective values of a plurality of parameters of the aircraft;
means for calculating a deflection instruction δq, using the following expressions:

$$\begin{cases} \delta q = (Q1 - F + \Delta RMI)/G \\ F = \rho \cdot V^2 \cdot S \cdot l \cdot Cm/2 \cdot I \\ G = \rho \cdot V^2 \cdot S \cdot l(\partial Cm/\partial \delta q)/2 \cdot I \\ \Delta RMI = K \cdot \left(-Q\mathit{eff} + \int (F + G \cdot \delta q\mathit{eff} - \Delta RMI) \cdot dt\right) \end{cases}$$

in which:
Q1 represents said pitch acceleration instruction;
ρ is the volumic mass of air;
V is the speed of the aircraft;
S is a reference surface of the aircraft;
l is a reference length of the aircraft;
Cm represents a pitch coefficient;
I represents a pitch inertia;
∂Cm/∂δq represents an efficiency coefficient;
K is a predetermined coefficient;
Qeff represents an effective pitch rate of the aircraft;
∫ illustrates an integration function; and
δqeff is an effective deflection angle of the elevators of the aircraft and
means of actuating said elevators of the aircraft, to which said deflection instruction is transmitted and which is applied (exclusively) to said elevators.

Moreover, in a particular embodiment, said device furthermore comprises:
means for limiting said pitch objective; and/or
means for limiting said pitch acceleration instruction.

BRIEF DESCRIPTION OF THE DRAWINGS

The figures of the appended drawing will give a good understanding of how the invention can be embodied. In these figures, identical references indicate similar elements.

Figure 1:
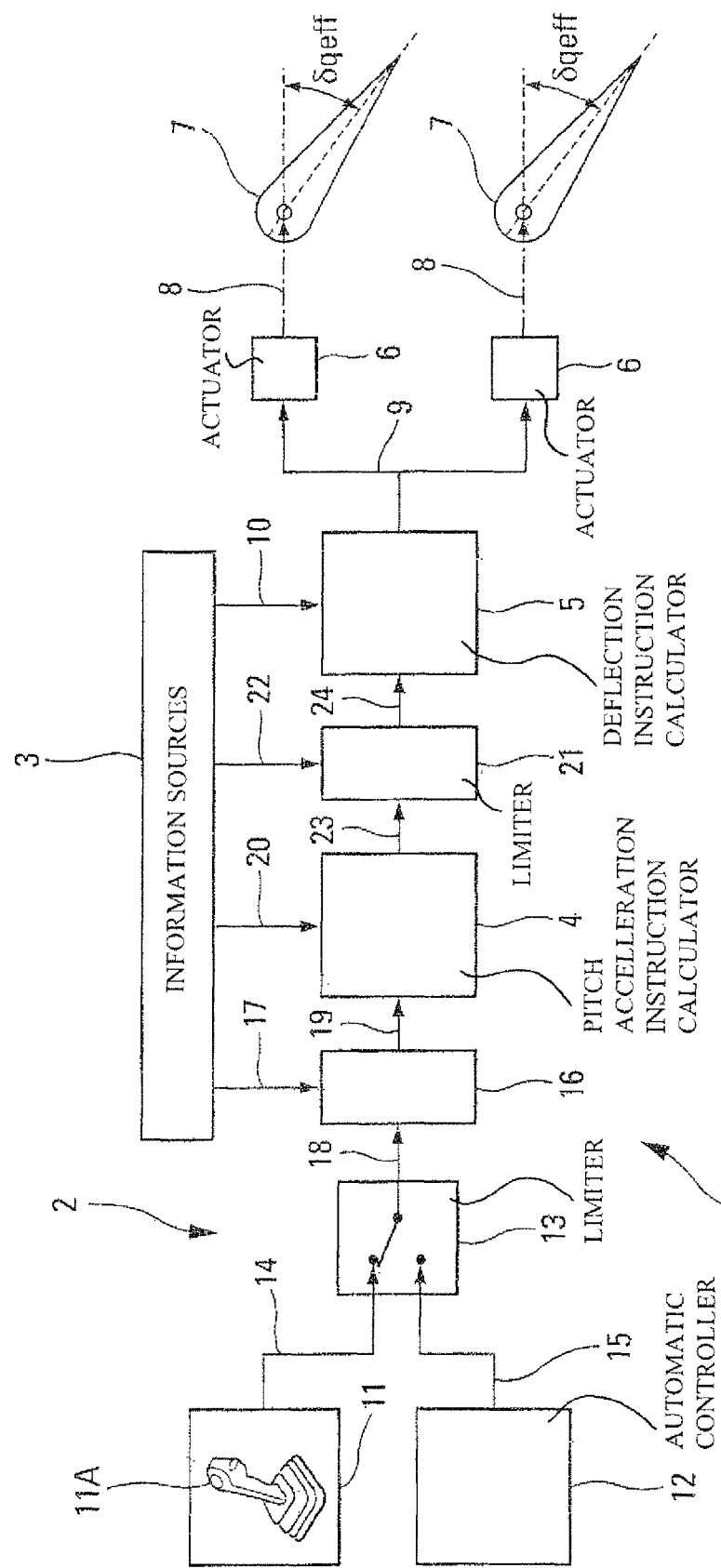
FIG. 1 is the block diagram of an active pitch control device according to the invention.

The device 1 according to the invention and shown in block diagram form in FIG. 1 is intended to carry out an active control of the pitch of an aircraft, in particular of a transport aircraft.

DETAILED DESCRIPTION OF THE INVENTION

For this purpose, said device 1 which is installed in the aircraft comprises, according to the invention:
means 2, described below, for generating a pitch objective QO which is illustrated in the form of a pitch rate (expressed in degrees of attitude per second) and which must be applied to the aircraft (not shown);
an assembly 3 of information sources, which comprises means for determining the effective values of a plurality of parameters of the aircraft as described below;
means 4 for calculating, at least from said pitch objective QO, a pitch acceleration instruction Q1;
means 5 for calculating a deflection instruction δp, using said acceleration instruction Q1, and doing so in the way described below; and
means 6 of actuating usual elevators 7 of the aircraft.

Said actuating means 6 are formed in such a way as to bring, as illustrated by a link 8 in dotted and dashed line, said elevators 7 into a particular position. In the example and the situation of FIG. 1, this position is such that the elevators 7 exhibit a particular deflection angle δeff. According to the invention, said actuating means 6 receive, by the intermediary of a link 9, the deflection instruction δp which is calculated by said means 5 and which is to be applied to said elevators 7.

Moreover, according to the invention, said means 5, which are connected by the intermediary of a link 10 to said assembly 3, calculate said deflection instruction δp, using the following expressions:

$$\begin{cases} \delta q = (Q1 - F + \Delta RMI)/G \\ F = \rho \cdot V^2 \cdot S \cdot l \cdot Cm/2 \cdot I \\ G = \rho \cdot V^2 \cdot S \cdot l(\partial Cm/\partial \delta q)/2 \cdot I \\ \Delta RMI = K \cdot \left(-Q\mathit{eff} + \int (F + G \cdot \delta q\mathit{eff} - \Delta RMI) \cdot dt\right) \end{cases}$$

wherein:
Q1 represents said pitch acceleration instruction received from said means 4;
ρ is the volumic mass of air;
V is the speed of the aircraft;
S is a reference surface which is known for the aircraft in question;

l is a reference length of the aircraft, which represents the average aerodynamic chord and which is known for the aircraft in question;

Cm represents a pitch coefficient which is calculated in the way described below;

I is a pitch inertia;

$\partial Cm/\partial \delta q$ represents an efficiency coefficient, which is calculated in the way described below;

K is a predetermined coefficient;

Qeff represents the effective pitch rate of the aircraft, which is measured;

$\int$ illustrates an integration function, and $\delta qeff$ is the effective deflection angle of the elevators 7, which is measured on the aircraft.

The values V, Qeff and $\delta qeff$ are measured using usual means forming part of said assembly 3 of information sources. In particular, V and $\delta qeff$ can be measured by appropriate sensors and Qeff can be determined by an inertial system.

Said means 5 will be further described below with reference to FIG. 2.

Control of an aircraft by pitch objective, implemented by the device 1 according to the invention, allows the pilot to control in a robust and repetitive manner the pitch dynamics of the aircraft during landing and takeoff phases. With regard to the pilot, the aircraft is made insensitive to variations in mass, trim and chosen takeoff aerodynamic configuration, to the chosen takeoff thrust and to an engine failure, whilst offering active and sure protection against a tail touch-down or against a touch-down that is too hard on landing, as described below.

When applied to a cruise phase, this device 1 makes it possible, in addition and by construction, to manage, automatically and imperceptibly for the pilot, all of the transients affecting the pitch of the aircraft (retraction/deployment of the undercarriages, retraction/deployment of the air brakes, retraction/deployment of slats and flaps, thrust variation, etc,).

Said active pitch control device 1 can be applied during different situations of the aircraft, and in particular:

during a movement of the aircraft for the purpose of a takeoff;

during a rotation during a takeoff;

during a flare out during a landing;

during a movement following a landing.

Moreover, this device 1 can be applied equally well to a manual piloting mode as to an automatic piloting mode (implemented using an automatic control means) of the aircraft.

In a particular embodiment, shown in FIG. 1, said means 2 comprise:

a joystick system 11 which comprises a pitch control joystick 11A, which is able to be operated by the pilot of the aircraft in such a way as to transmit a pitch objective QOA. This pitch objective QOA is obtained in the usual manner by a linear conversion of the angle of deflection generated by the pilot operating said joystick 11A;

an automatic control means 12 which automatically generates a pitch objective QOB in the way described below; and a selection means 13 which is connected by the intermediary of links 14 and 15 respectively to said joystick system 11 and to said automatic control means 12 and which transmits, as a pitch objective QO used by the device 1, one of the two pitch objectives QOA and QOB generated by said joystick system and by said automatic control means 12 respectively. Said selection means 13 selects the value QOA or the value QOB in the usual manner by taking account of particular parameters.

In a particular embodiment, said automatic control means 12 calculates the pitch objective QOB using a transfer function which is equivalent of a first order filter and which satisfies the following equation:

$$QOB = \omega.(\theta c - \theta eff)/2.z$$

wherein:

$\theta c$ is a predetermined attitude value, which is given in the operating manual available to the crew;

$\theta eff$ is the effective value of the attitude, which is measured on the aircraft;

$\omega$ is a fluctuation which is adjustable; and z is a damping parameter which is also adjustable.

This pitch objective QOB is then limited to a predetermined maximum value.

In a particular embodiment, the device 1 furthermore comprises limiting means 16 which are respectively connected by the intermediary of links 17, 18 and 19 to said assembly 3, to said selection means 13 and to said means 4 and which are formed in such a way as to limit, if necessary, said pitch objective QO to a minimum limit value QOmin or to a maximum limit value QOmax of pitch rate, before transmitting it to the means 4 so that they use it in the calculation of the pitch acceleration instruction Q1.

Preferably, said minimum limit value QOmin and said maximum limit value QOmax of pitch rate, calculated and taken into account by said limiting means 16, respectively satisfy the following equations:

$$\begin{cases} QO\text{min} = nz\text{min}/(V \cdot g) \\ QO\text{max} = nz\text{max}/(V \cdot g) \end{cases}$$

wherein:

nzmin and nzmax are predetermined minimum and maximum values of the load factor. These values are fixed for the takeoff and landing maneuvers, that is to say, preferably, at −1 g for the minimum value and at +1 g for the maximum value;

g is the acceleration of gravity; and

V is the speed of the aircraft, which is measured in the usual manner and received through the link 17.

The preceding limitation of the pitch objective QO has the advantage of managing the vertical load factor operating range in order to comply with the structural constraints applicable to the aircraft and for which the aircraft was designed and certified. By way of example, the maximum load factor variation with respect to 1 g is ±1.5 g for hyperlift configurations (those of takeoff and landing) and −2/+1.5 g for the smooth configuration (that of the cruise phase).

In a particular embodiment:

said assembly 3 furthermore comprises usual means for measuring the effective value Qeff of said pitch rate; and said means 4 calculate said pitch acceleration instruction Q1 using the following expression (which represents a transfer function equivalent to a first order filter):

$$Q1 = 2.z.w.(QO - Qeff)$$

wherein:

QO represents said pitch objective received from said means 2;

Z represents a first adjustable damping parameter; and

W represents an adjustable fluctuation.

The device 1 according to the invention furthermore comprises limiting means 21 which are connected by the intermediary of links 22, 23 and 24 to the assembly 3, to the means 4 and to the means 5 respectively and which are formed in such a way as to limit, if necessary, said pitch acceleration instruction Q1 to a minimum limit value Q1min or to a maximum limit value Q1max. In order to do this, said means 21 comprise a protection element, for example of the voter type, which transmits to said means 5, by the intermediary of the link 24, one of the following values:

said pitch acceleration instruction Q1 received from said means 4;
said minimum limit value Q1min; or
said maximum limit value Q1max.

According to the invention, said means 21 limit said pitch acceleration instruction Q1 to the minimum limit value Q1min for protecting against a descent speed of the aircraft that is too fast during a landing. Said means 21 preferably calculate said minimum limit value Q1min using the following expressions:

$$\begin{cases} Q1min = \omega \cdot (\omega \cdot (\theta min - \theta eff) - 2 \cdot Qeff) \\ \theta min = \alpha eff + \arcsin(Vzmin/Vsol) \end{cases}$$

wherein:
$\omega$ represents an adjustable fluctuation;
$\theta eff$ represents the effective attitude of the aircraft;
$Qeff$ represents the effective pitch rate of the aircraft;
$\alpha eff$ represents the effective incidence of the aircraft;
$Vzmin$ is a predetermined value; and
$Vsol$ is the ground speed of the aircraft.

The values $\theta eff$, $Qeff$, $\alpha eff$ and $V$ are measured by usual sensors forming part of the assembly 3 and are provided to said means 21 by the intermediary of the link 22.

Moreover, said means 21 also limit said pitch acceleration instruction Q1 to a maximum limit value, in particular for protecting against a tail touch-down of the aircraft during a takeoff. Preferably, however, said maximum limit value Q1max corresponds to the lowest value of three accelerations Q1Amax, Q1Bmax and Q1Cmax described below. In this case, said maximum limit value Q1max can be obtained using a means, for example of the voter type, making it possible to select the lowest value of said three accelerations Q1Amax, Q1Bmax and Q1Cmax.

More precisely:
Q1Amax represents a protection against a tail touch-down. This value depends on the maximum attitude not to be exceeded, which is a function of the ratio Vc/Vs1g and of the radio-altimeter height, Vc being the conventional speed of the aircraft and Vs1g being the takeoff speed with unit load factor. Vs1g depends on the configuration and on the weight of the aircraft. This protection makes it possible to guarantee that the separation between the tail of the aircraft and the ground does not exceed a certain value, without using a specific measuring device for this;
Q1Bmax represents the rotation capability of the aircraft, which depends on the minimum deflection angle of the elevators 7. This value satisfies the following equation:

$Q1Bmax = \rho.V^2.S.l(Cm + \partial Cm/\partial \delta q.\delta qmax)/2.I$; and Q1Cmax is a predetermined value which represents the average pitch acceleration which must be complied with in order to obtain a particular piloting sensitivity.

Figure 2:
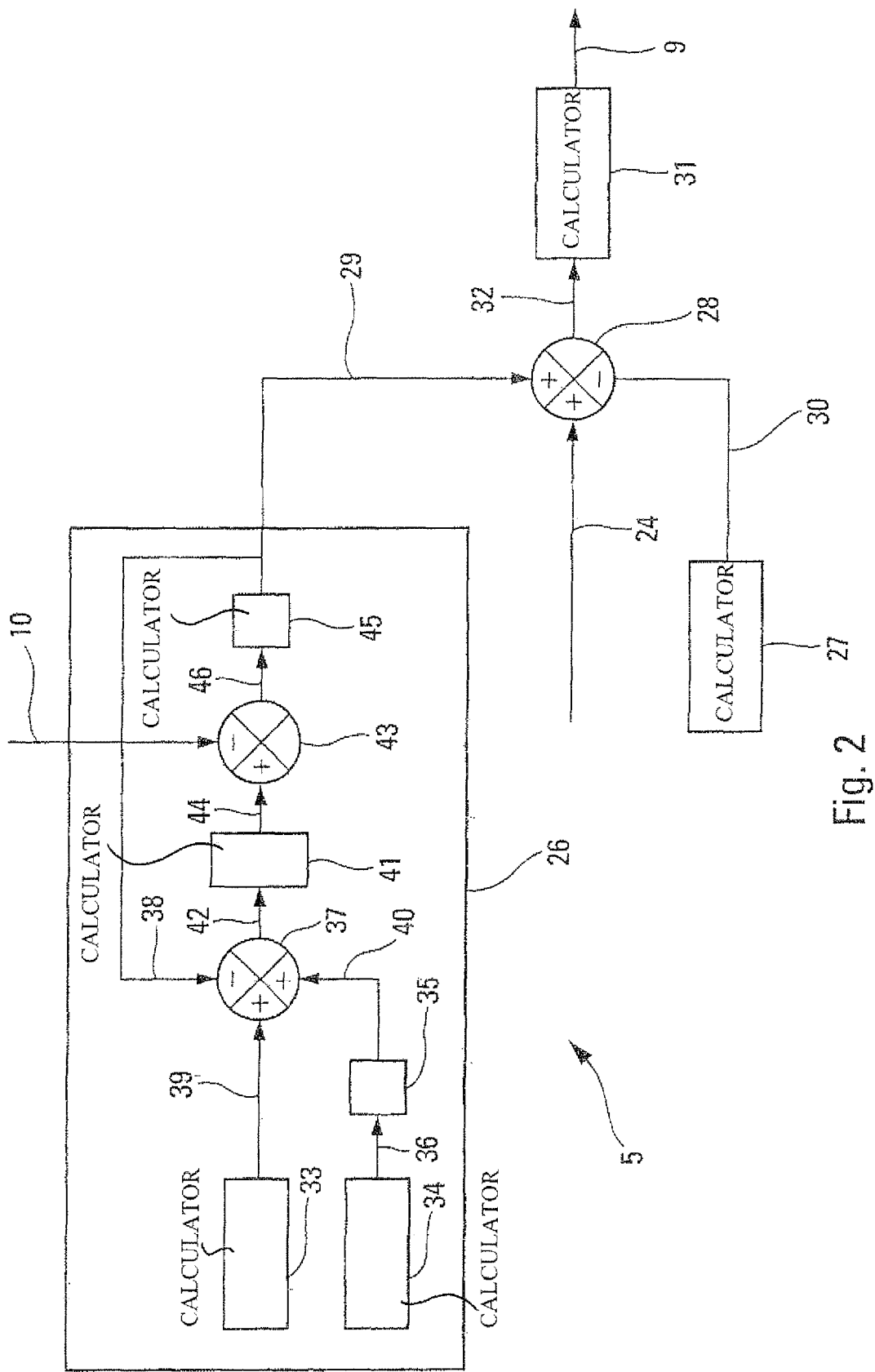
FIG. 2 is a diagrammatic illustration of a particular embodiment of means of calculating a deflection instruction, forming part of a control device according to the invention.

FIG. 2 shows a preferred embodiment of said means 5 which are intended to calculate said deflection instruction $\delta p$ from the aforesaid expressions. In this case, said means 5 comprise:

means 26 for calculating the value $\Delta RMI$;
a calculating means 27 for determining the function F using the following expression: $F = \rho.V^2.S.l.Cm/2.I$; and
a calculating means 28 which is connected by the intermediary of the links 29 and 30 to said means 26 and 27 respectively and which is also connected to the link 24 transmitting the value Q1. This calculating means 28 is intended to calculate the following sum:

$Q1 - F + \Delta RMI$ a calculating means 31:
which is connected by the intermediary of a link 32 to said calculating means 28, and to the link 7;
which calculates the function G satisfying the following equation:

$G = \rho.V^2.S.l(\partial Cm/\partial \delta q)/2.I$; and which divides the sum received from said calculating means 28 by this function G in order to obtain the deflection instruction $\delta q$ satisfying the following expression: $\delta q = (Q1 - F + \Delta RMI)/G$.

Moreover, said means 26 which are intended to calculate the value $\Delta RMI$ comprise the following elements:
a calculating means 33 for calculating the function F in a way that is similar to the calculation carried out by the calculating means 27;
a calculating means 34 for calculating the function G by means of a calculation similar to that used by the calculating means 31;
a calculating means 35 which is connected by the intermediary of a link 36 to said calculating means 34 and which multiplies said function G by the effective deflection angle $\delta qeff$ (received from said assembly 3) of the elevators 7;
a calculating means 37 which is connected to the links 38, 39, 40 and 42 and which calculates the following expression: $F + G.\delta qeff - \Delta RMI$;
a calculating means 41 which carries out the integration of the expression received from said calculating means 37;
a calculating means 43 which calculates the following expression:

$\int(F + G.\delta qeff - \Delta RMI).dt - Qeff$, Qeff being received through the link 10; and a calculating means 45 which is connected by the intermediary of a link 46 to said calculating means 43 and which multiplies the expression received from said calculating means 43 by a predetermined coefficient K.

Moreover, in a preferred embodiment, said means 5 determine said pitch coefficient Cm and said efficiency coefficient $\partial Cm/\partial \delta q$ using a neural network each time.

The principle of the neural network can be generalized by the following expression:

$$\forall j, 1 \leq j \leq ns, y^j = \Phi\left(\sum_{l=o}^{i=ne} u_j^i \cdot x^j\right)$$

The networks used are single layer neural networks.
The chosen activation function $\Phi(x)$ satisfies the following expression:

$\Phi(x) = 1/(1 + |x|)$

Wherein x represents the input of the activation function.

This activation function is easy to use.

The neural network suitable for use by said means 5 is described, in particular, in the document entitled "Neural Networks—Contribution to Modelling for Flight Control" and published on the occasion of the "World Aviation Congress" held in Reno (United States) in 2004.

Thus, due to the use of neural networks, it is possible to obtain accurate coefficients Cm and ∂Cm/∂δq, which makes it possible to increase the efficiency of the pitch control device 1.

The invention claimed is:

1. An active pitch control method for an aircraft, comprising:
   a) generating a pitch objective which is expressed in the form of a pitch rate and which must be applied to the aircraft;
   b) from said pitch objective, calculating a pitch acceleration instruction Q1;
   c) calculating a deflection command δq using the following expressions:

$$\begin{cases} \delta q = (Q1 - F + \Delta RMI)/G \\ F = \rho \cdot V^2 \cdot S \cdot l \cdot Cm/2 \cdot I \\ G = \rho \cdot V^2 \cdot S \cdot l(\partial Cm/\partial \delta q)/2 \cdot I \\ \Delta RMI = K \cdot \left(-Qeff + \int (F + G \cdot \delta qeff - \Delta RMI) \cdot dt\right) \end{cases}$$

wherein:
   Q1 represents said pitch acceleration instruction;
   ρ is the volumic mass of air;
   V is the speed of the aircraft;
   S is a reference surface of the aircraft;
   l is a reference length of the aircraft;
   Cm represents a pitch coefficient;
   I represents a pitch inertia;
   ∂Cm/∂δq represents an efficiency coefficient;
   K is a predetermined coefficient;
   Qeff represents an effective pitch rate of the aircraft;
   ∫ illustrates an integration function; and
   δqeff is an effective deflection angle of the elevators of the aircraft; and
   d) applying said deflection instruction δq to the elevators of the aircraft.

2. The method as claimed in claim 1, wherein in step a) said pitch objective is generated by an automatic control means of the aircraft.

3. The method as claimed in claim 1, wherein in step a) said pitch objective is generated by a joystick system comprising a pitch control joystick, which is able to be operated by a pilot of the aircraft.

4. The method as claimed in claim 1, wherein:
   the effective value Qeff of said pitch rate is measured; and
   in step b), said pitch acceleration instruction Q1 is calculated using the following expression:

$Q1 = 2 \cdot z \cdot w \cdot (QO - Qeff)$ wherein:
   QO represents said pitch objective;
   z represents an adjustable damping parameter; and
   w represents an adjustable fluctuation.

5. The method as claimed in claim 1, wherein said pitch coefficient Cm is determined using a neural network.

6. The method as claimed in claim 1, wherein said efficiency coefficient ∂Cm/∂δq is determined using a neural network.

7. The method as claimed in claim 1, wherein said pitch objective QO is limited to a minimum limit value QOmin and to a maximum limit value QOmax of pitch rate, before using it for calculating the pitch acceleration instruction Q1.

8. The method as claimed in claim 7, wherein said minimum limit value QOmin and said maximum limit value QOmax of the pitch rate respectively satisfy the following equations:

$$\begin{cases} QOmin = nzmin/(V \cdot g) \\ QOmax = nzmax/(V \cdot g) \end{cases}$$

wherein:
   nzmin and nzmax are predetermined minimum and maximum values of the load factor;
   g is the acceleration of gravity; and
   V is the speed of the aircraft.

9. The method as claimed in claim 1, wherein said pitch acceleration instruction Q1 is limited to a minimum limit value in order to achieve protection against a descent speed of the aircraft that is too fast during a landing.

10. The method as claimed in claim 9, wherein said minimum limit value Q1min is calculated using the following expressions:

$$\begin{cases} Q1min = \omega \cdot (\omega \cdot (\theta min - \theta eff) - 2 \cdot Qeff) \\ \theta min = \alpha eff + \arcsin(Vzmin/Vsol) \end{cases}$$

wherein:
   ω represents an adjustable fluctuation;
   θeff represents an effective attitude of the aircraft;
   Qeff represents an effective pitch rate of the aircraft;
   αeff represents an effective incidence of the aircraft;
   Vzmin is a predetermined value; and
   Vsol is the ground speed of the aircraft.

11. The method as claimed in claim 1, wherein said pitch acceleration instruction Q1 is limited to a maximum limit value in order to achieve at least a protection against a tail touch-down of the aircraft during a takeoff.

12. The method as claimed in claim 11, wherein said maximum limit value corresponds to the smallest value of three accelerations respectively corresponding to:
   a protection against a tail touch-down;
   the rotation capability of the aircraft depending on a minimum deflection of the elevators; and
   a predetermined acceleration depending on a piloting sensitivity.

13. An active pitch control device for an aircraft, wherein it comprises:
   means for generating a pitch objective which is expressed in the form of a pitch rate and which must be applied to the aircraft;
   means for calculating, from said pitch objective, a pitch acceleration instruction;
   means for determining the effective values of a plurality of parameters of the aircraft;
   means for calculating a deflection instruction δq, using the following expressions:

$$\begin{cases} \delta q = (Q1 - F + \Delta RMI)/G \\ F = \rho \cdot V^2 \cdot S \cdot l \cdot Cm/2 \cdot I \\ G = \rho \cdot V^2 \cdot S \cdot l(\partial Cm/\partial \delta q)/2 \cdot I \\ \Delta RMI = K \cdot \left( -Qeff + \int (F + G \cdot \delta qeff - \Delta RMI) \cdot dt \right) \end{cases}$$

in which:
Q1 represents said pitch acceleration instruction;
$\rho$ is the volumic mass of air;
V is the speed of the aircraft;
S is a reference surface of the aircraft;
l is a reference length of the aircraft;
Cm represents a pitch coefficient;
I represents a pitch inertia;
$\partial Cm/\partial \delta q$ represents an efficiency coefficient;
K is a predetermined coefficient;
Qeff represents an effective pitch rate of the aircraft;
$\int$ illustrates an integration function; and
$\delta qeff$ is an effective deflection angle of the elevators of the aircraft; and
means of actuating said elevators of the aircraft, to which said deflection instruction is transmitted and which is applied to said elevators.

14. The device as claimed in claim 13, wherein it furthermore comprises means for limiting said pitch objective.

15. The device as claimed in claim 13, wherein it furthermore comprises means for limiting said pitch acceleration instruction.

16. An aircraft, wherein it comprises a device as claimed in claim 13.

* * * * *